United States Patent [19]

Zettervall et al.

[11] Patent Number: 4,841,662
[45] Date of Patent: Jun. 27, 1989

[54] SPINNING ROD

[76] Inventors: Ettmar Zettervall, Norrby Skogsväg 27,, S-136 49 Handen, Sweden;

[21] Appl. No.: 265,852
[22] Filed: Oct. 27, 1988

[30] Foreign Application Priority Data

Apr. 29, 1986 [SE] Sweden .................... 8601970

[51] Int. Cl.⁴ ............................ A01K 87/00
[52] U.S. Cl. ............................ 43/25.2
[58] Field of Search .............. 43/25.2, 18.1, 18.5, 43/25

[56] References Cited

U.S. PATENT DOCUMENTS

| 2,742,728 | 4/1975 | Boyd | 43/18.1 |
|---|---|---|---|
| 3,026,644 | 3/1962 | Raider | 43/25.2 |
| 3,036,398 | 5/1962 | Gagner | 43/18.1 |
| 3,416,256 | 12/1968 | Blocker | 43/25.2 |
| 3,927,486 | 12/1975 | Yuen | 43/23 |
| 3,992,799 | 11/1976 | Oakes | 43/25 |
| 4,027,419 | 6/1977 | Popeil | 43/18.1 |

FOREIGN PATENT DOCUMENTS 8404502  3/1986  Sweden .

Primary Examiner—Gene P. Crosby
Attorney, Agent, or Firm—Pollock, Vande Sande & Priddy

[57] ABSTRACT

A spinning rod having a line (14), handle part (3,4) and rod (11) in at least two parts, where the handle part is implemented as a tube with an expansion at its end facing towards the rod. By this arrangement the entire spoon and the parts of the rod may be completely or partially stored in said tubular part during transport.

7 Claims, 1 Drawing Sheet

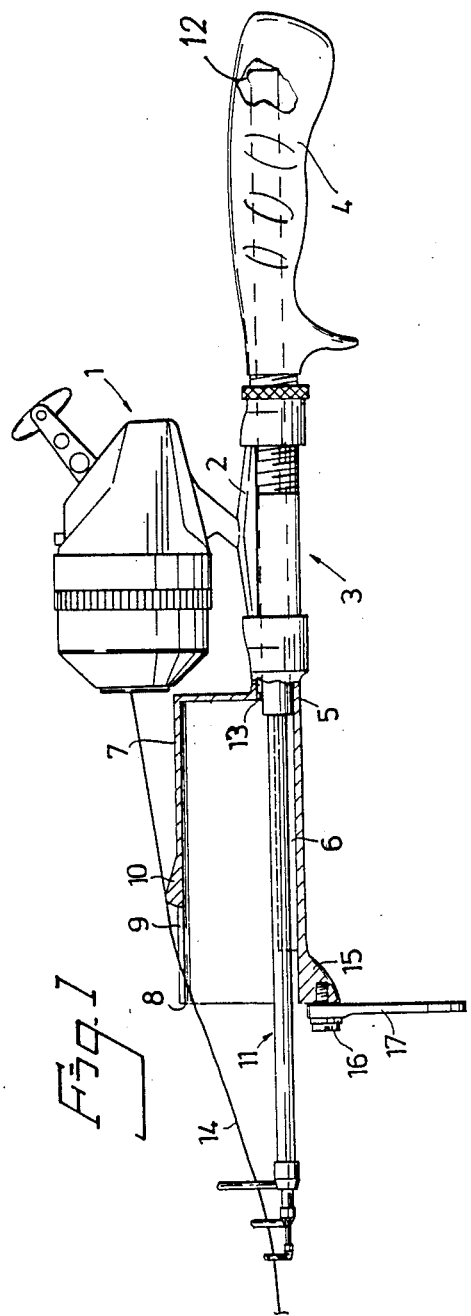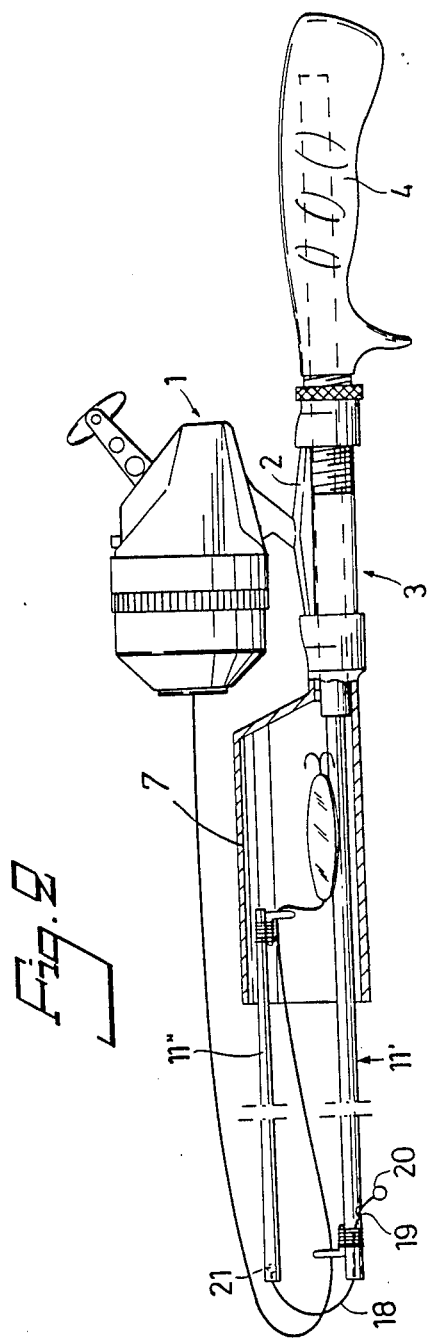

SPINNING ROD

The present invention relates to a spinning rod. More specifically, the invention relates to the type of spinning rod having a line, one end of which is connected to a trolling spoon and the other end of which is connected to a reeling device attached to a handle portion.

Spinning rods of this type are well-known, but they have, inter alia, the disadvantage that the spoon and line get tangled with each other and that they easily get caught in clothes and the like. It is also known to keep the spoon itself in a separate box during transport, this box being mounted on the handle portion. There are two disadvantages with this solution, namely that the box with its mounting means will be expensive to manufacture, and that the rod will be voluminous in transport. The object of this invention is therefore primarily to surmount these and other disadvantages. The characterising features of the invention will be seen from the disclosures in the claims.

The invention will now be described in detail with the aid of two embodiments thereof and with reference to the accompanying drawings, on which FIG. 1 illustrates a first embodiment, partly in a longitudinal section, and FIG. 2 illustrates a second embodiment, partly in a longitudinal section.

In FIG. 1, the numeral 1 denotes the casting reel, i.e. the mechanism known per se, which allows the line to run out from the reeling device, be reeled up on this reeling device and to be clamped in relation thereto. Conventionally the reel has a foot portion 2, with which it is fastened to a handle part 3, this part being terminated by a gripping part 4, as will be seen from FIG. 1. In the embodiment illustrated in FIG. 1, the handle part is tubular 5 in the major part of its extension, and in its upper left part 7 it is expanded, while in its lower part 6 it is provided with a channel of preferably circular cross section so that the tubular part in this section of its extension will be open upwards in the Figure. The handle is suitably made in one piece, e.g. by moulding and gluing. An axial slit (9), departing from the tube part 8, extends as far as a softly rounded nose 10, for a purpose that will be explained later.

The rod itself has been given a telescopic implementation and is denoted by the numeral 11. Each telescopic section has in a suitable, conventional manner, an eyelet-shaped guide for the line. To the right in the Figure, the heaviest rod section has at its end a projection, or other protuberance 12, and, in coaction with a corresponding inwardly directed abutment 13 in the tube of the handle portion, it restricts the movement of the rod to the left in the Figure. Of course, all rod sections are formed such that they can not be withdrawn from each other, and on being pulled out they are locked to each other. The tubular section 5 may thus be regarded as a rod section with an expanded portion.

The fishing line 14, carrying the trolling spoon at one end, as mentioned, is taken via the eyelet-like guides to the reeling mechanism, and it may have an inclined length, as in the Figure. The slit and nose 10 mentioned above have been provided so that the line does not rub against the forward edge portion of the sleeve 7.

At its lowest left part the sleeve 7 has a thickened portion 15, for a screw or other mounting 16, carrying a cover intended to close off the mouth of the sleeve. The spinning rod now described is used in a conventional manner with the rod sections extended. When fishing is finished, the rod is telescoped together and into the tube 5 of the handle part at the same time as the line is reeled in with the aid of the crank on the reeling device, the spoon being inserted in the expanded part 7 of the tube. In a fully retracted state, the eyelike guides are in the rearward region of the part 7 and project up from the part 6, the spoon also being in the expanded tube part with the line 14 taken out via the slit and the nose 10 to the reel of the reeling mechanism.

In this situation the cover can be swung up to cover the mouth of the part 7, and the entire spinning rod then takes up a minimum of space, while the risk of damage from the fish hooks is eliminated. It will be understood that the mounting of the cover 17 is adapted such that in a closed position the cover is suitable pressed against the mouth of the part 7. The cover may have a shallow recess corresponding to the shape of the mount and be under the bias of a spring-loaded bush or the like, so that in an active position the cover can snap into position over the mouth without it being possible to uncover the latter unintentionally.

In FIG. 2 there is illustrated a spinning rod which is generally the same as the one now described, but is somewhat cheaper. In this embodiment the rod is not telescopic, and comprises two parts 11' and 11'', these being adapted such that they can be put together to form a rod, e.g. by one end of the part 11'''' being inserted with frictional engagement in one end of the part 11', the length of the rod substantially being the sum of the lengths of the parts. Here the part 11' is axially displaceable in the tube of the handle part and the parts 11' and 11'''' are collapsible in relation to each other via a joint, and in FIG. 2 this is arranged in a simple way by a cable 18 being taken through the mutually adjacent portions of these two tubular parts and out through holes 19 and 21. At its free ends the cable is provided with balls or the like, so that it cannot not be lost. In the embodiment, when fishing is finished the parts 11' and 11'''' are brought towards each other as illustrated in FIG. 2, the spoon and part 11'''' being inserted into the part 7 and the part 11' is pushed into the handle part. There is thus provided a spinning rod which, similar to the one described above, keeps the trolling spoon protected inside the expanded tube part, and where the rod is shortened for transport, although naturally not to the same extent as for the embodiment described here first. This rod should also be provided with a cover of a configuration suitable to the mouth of the sleeve 7, with the parts 11' and 11'''' in the positions illustrated in FIG. 2.

What is distinguishing for the invention is that there is a tubular handle part with an expansion which is suitably formed integrally with a handle (4) and which is formed such that it can accommodate the trolling spoon as well as at least a part of the rod (11,11',11'''') and that almost all of the length of the handle part (6) can accommodate the rod or a portion thereof.

I claim:

1. A spinning rod having a line (14), on one end of which there is attached a trolling spoon and which is attached to a reeling device (1) at its other end, the reeling device being fastened to a handle part (3,4), the spinning rod having a rod portion, the rod portion (11) being in at least two parts, wherein in that for the major part of its length the handle part is tubular, the tubular portion at its end facing towards the rod portion being expanded so that the entire spoon and at least a portion of the rod portion (11) may be stored in the expanded tubular part (6,7).

2. As claimed in claim 1, and implemented telescopically, wherein in that the expanded tubular part (5) is dimensioned such that the largest telescopic part may be inserted into it.

3. A spinning rod as claimed in claims 1 wherein in that the expanded tubular part is dimensioned such that the spoon as well as the entire rod may be completely inserted into it.

4. A spinning rod as claimed in claim 1, wherein in that on its upper side the expanded tubular part (7) is provided with a slit (9) for guiding the line (14) and on its lower side (6) is provided inside the tube with the tube with a channel for guiding a rod portion section therein, the channel being implemented such that eyelet-like guides on the rod portion sections may pass along it.

5. A spinning rod as claimed in claim 1, wherein in that the rod portion comprises two parts (11',11") which are collapsible in relation to each other via a joint (18), such that one part (11") may be inserted in the hole of the tubular part of the handle part, and in that the other rod part (11') together with the spoon may be inserted in the expanded tubular part (7).

6. A spinning rod as claimed in claim 5, wherein in that said joint comprises a cable or wire (18) taken through holes (19,21) in mutually adjacent tubular ends of the rod parts, and in that the wire has balls at its free ends so that it can not leave the rod parts.

7. Rod as claimed in claim 2, wherein the expanded tubular part is dimensioned such that the spoon as well as the entire rod may be completely inserted into it.

* * * * *